United States Patent
Elzur

(10) Patent No.: US 7,430,211 B2
(45) Date of Patent: *Sep. 30, 2008

(54) SYSTEM AND METHOD FOR RECEIVE QUEUE PROVISIONING

(75) Inventor: Uri Elzur, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 736 days.

This patent is subject to a terminal disclaimer.

(21) Appl. No.: 10/688,373

(22) Filed: Oct. 17, 2003

(65) Prior Publication Data

US 2004/0085984 A1 May 6, 2004

Related U.S. Application Data

(60) Provisional application No. 60/419,354, filed on Oct. 18, 2002, provisional application No. 60/420,901, filed on Oct. 24, 2002, provisional application No. 60/439,951, filed on Jan. 14, 2003, provisional application No. 60/442,360, filed on Jan. 24, 2003.

(51) Int. Cl.
*H04L 12/28* (2006.01)

(52) U.S. Cl. ............... 370/412; 370/429; 709/235

(58) Field of Classification Search ............ 370/413, 370/414

See application file for complete search history.

(56) References Cited

U.S. PATENT DOCUMENTS

| 4,493,021 A * | 1/1985 | Agrawal et al. ............ 709/236 |
|---|---|---|
| 5,313,582 A | 5/1994 | Hendel et al. |
| 5,958,017 A * | 9/1999 | Scott et al. ................. 709/235 |
| 6,341,302 B1 | 1/2002 | Celis |
| 6,426,957 B1 | 7/2002 | Hauser et al. |
| 6,501,757 B1 | 12/2002 | Kamaraj et al. |
| 6,611,883 B1 * | 8/2003 | Avery ......................... 710/22 |
| 6,721,806 B2 * | 4/2004 | Boyd et al. ................. 719/312 |
| 2002/0055993 A1 | 5/2002 | Shah et al. |
| 2002/0083175 A1 * | 6/2002 | Afek et al. .................. 709/225 |
| 2002/0087710 A1 * | 7/2002 | Aiken et al. ................ 709/232 |
| 2002/0101820 A1 * | 8/2002 | Gupta et al. ................ 370/229 |
| 2002/0118667 A1 * | 8/2002 | Chintada et al. ........... 370/349 |
| 2002/0133648 A1 * | 9/2002 | Goudie et al. ................ 710/56 |
| 2002/0141424 A1 | 10/2002 | Gasbarro et al. |

FOREIGN PATENT DOCUMENTS

| WO | WO-00/10095 A | 2/2000 |
|---|---|---|
| WO | WO-00/41365 A | 7/2000 |
| WO | WO-00/72142 A | 11/2000 |

* cited by examiner

*Primary Examiner*—Chau Nguyen
*Assistant Examiner*—Louis Bell
(74) *Attorney, Agent, or Firm*—McAndrews, Held & Malloy, Ltd.

(57) ABSTRACT

Systems and methods that provide receive queue provisioning are provided. In one embodiment, a communications system may include, for example, a first queue pair (QP), a second QP, a general pool and a resource manager. The first QP may be associated with a first connection and with at least one of a first limit value and an out-of-order threshold. The first QP may include, for example, a first send queue (SQ). The second QP may be associated with a second connection and with a second limit value. The second QP may include, for example, a second SQ. The general pool may include, for example, a shared receive queue (SRQ) that is shared by the first QP and the second QP. The resource manager may provide, for example, provisioning for the SRQ and may manage the first limit value and the second limit value.

28 Claims, 6 Drawing Sheets

SYSTEM AND METHOD FOR RECEIVE QUEUE PROVISIONING

CROSS-REFERENCE TO RELATED APPLICATIONS

This application makes reference to, claims priority to and claims benefit from U.S. patent application Ser. No. 60/419,354, entitled "System and Method for Statistical Provisioning" and filed on Oct. 18, 2002; U.S. patent application Ser. No. 60/420,901, entitled "System and Method for Statistical Provisioning" and filed on Oct. 24, 2002; U.S. patent application Ser. No. 60/439,951, entitled "System and Method for Statistical Provisioning" and filed on Jan. 14, 2003; and U.S. patent application Ser. No. 60/442,360, entitled "System and Method for Statistical Provisioning" and filed on Jan. 24, 2003.

This application also makes reference to U.S. patent application Ser. No. 10/688,392, entitled "System and Method for Receive Queue Provisioning" and filed on Oct. 17, 2003.

INCORPORATION BY REFERENCE

The above-identified United States patent applications are hereby incorporated herein by reference in their entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Conventional systems tend to waste precious resources when communicating via a queue pair (QP) connection. A conventional QP includes a dedicated send queue (SQ) and a dedicated receive queue (RQ) as well as a dedicated or shared completion queue (CQ). Thus, two-way communications can be achieved between peer systems via respective QPs. For example, a message can be sent from an SQ of a first peer system to an RQ of a second peer system. Similarly, a message can be sent from an SQ of the second peer system to an RQ of the first peer system.

When the number of connections between the peer systems increases, the number of QPs increases. Some conventional peer systems allocate the same amount of resources of a preset size to support each QP including the respective dedicated SQ and the respective dedicated RQ. However, such over-provisioning may be wasteful, in particular, with respect to the dedicated RQs. For example, if a particular connection is inactive or relatively inactive, a substantial portion of the resources allocated to the RQ of the inactive or relatively inactive QP remains unused and is not re-allocated for other purposes.

RQ resources are provisioned in anticipation of a burst of messages at wire speed. The user of a transport layer (e.g., a transmission control protocol (TCP) layer) provides a wide-open receive Window to improve performance beyond, for example, 64 KB per connection, thereby forcing the upper layer protocol (ULP) layer to manage the burst situation. Many applications such as Internet Small Computer System Interface (iSCSI) applications do not have a good upper bound as to the number of unsolicited messages that can be sent by one peer and received by another. This may cause connections to be torn down. Managing RQ resources on a per QP basis implies that each QP has to have enough buffers allocated to its RQ to handle a potential burst. When a particular machine serves a high number of QPs, a lot of buffers are allocated to QPs that may utilize them at a very low rate.

Some conventional systems do not control which connections consume buffers and which connections are dropped. In layered protocol processing, when resources are scarce, data is buffered by a central entity such as a TCP layer until a ULP application procures additional buffering. In rototilled protocol processing, when resources are scarce, data or the connection is dropped requiring either resending of the data or re-establishing the connection. When the ULP application procures additional buffers, then the ULP application may again receive data. In either processing scheme, buffers are consumed on a first-come-first-serve basis. Thus, typically inactive or relatively inactive connections can consume a substantial portion of the available resources, thereby limiting the available resources for typically active connections. Such typically active connections, which tend to be the more important consumers, suffer from reduced traffic bandwidth, are be torn down or have higher costs associated with them for the same level of functionality, for example, as larger memories are provided. In fact, one or more malicious connections (e.g., a rogue desktop) or malfunctioning connections can drain all of the available resources to the detriment of all other connections.

Some conventional systems suffer from substantial delays in adjusting the amount of allocated resources for a particular connection. For example, in a credit-based system at least one round-trip delay between peer systems may be required before a particular resource allocation can be modified. Thus, if a connection suddenly becomes active thereby needing additional resources, then one peer system informs the other peer system which, in turn, acknowledges the change in resource allocation to the original peer system before communications using the adjusted resource allocation may commence. The round-trip delay can be substantial between distant peers or over a network with substantial latencies and may require additional attention from a software layer adapted to provide buffers. In many systems, the response time of such a software entity is large in comparison with network speeds and the response time required by high performance applications. In particular, the round-trip delay becomes compounded each time the resource allocation of the connection is adjusted. The round-trip delays also exacerbate synchronization issues between hardware and software. Moreover, as the number of connections increases, the inefficiencies in adjusting the resource allocations become accentuated.

Further limitations and disadvantages of conventional and traditional approaches will become apparent to one of ordinary skill in the art through comparison of such systems with some aspects of the present invention as set forth in the remainder of the present application with reference to the drawings.

BRIEF SUMMARY OF THE INVENTION

Some aspects of the present invention may be found, for example, in systems and methods that provide receive queue (RQ) provisioning. In one embodiment, the present invention may provide a communications system that may include, for example, a first queue pair (QP), a second QP, a general pool and a resource manager. The first QP may be associated with a first connection and with a first limit value. The first QP may include, for example, a first send queue (SQ). The second QP may be associated with a second connection and with a second limit value. The second QP may include, for example, a second SQ. The general pool may include, for example, a shared receive queue (SRQ) that is shared by the first QP and the second QP. The resource manager may provide, for example, provisioning for the SRQ. At least one of the first QP, the second QP and the resource manager may manage the first limit value and the second limit value.

In another embodiment, the present invention may provide a method for communications. The method may include, for example, one or more of the following: establishing a first connection associated with a first QP; establishing a second connection associated with a second QP; sharing an SRQ among the first QP and the second QP; assigning a local limit value to be associated with the first connection, the local limit value being associated with a maximum number of SRQ buffers that are accessible to the first QP; and dropping the first connection or an incoming message on the first connection if the first QP attempts to access more SRQ buffers than its maximum number.

In yet another embodiment, the present invention may provide a communications system. The communications system may include, for example, a first QP associated with a first connection; a second QP associated with a second connection; an SRQ shared by the first QP and the second QP; and a watermark. The watermark may indicate, for example, a low level of work queue elements (WQEs) on the SRQ.

In still another embodiment, the present invention may provide a method for communications. The method may include, for example, one or more of the following: sharing an RQ between a first QP associated with a first connection and a second QP associated with a second connection; setting a threshold that is associated with the shared RQ and is indicative of a particular number of WQEs on the shared RQ; and generating an asynchronous event if the threshold is reached.

These and other features and advantages of the present invention may be appreciated from a review of the following detailed description of the present invention, along with the accompanying figures in which like reference numerals refer to like parts throughout.

DETAILED DESCRIPTION OF THE INVENTION

Some aspects of the present invention may be found, for example, in systems and methods that provide receive queue (RQ) provisioning. In some embodiments, the present invention may provide a system that includes, for example, a shared receive queue (SRQ) that may be shared among a plurality of connections. The resources of the SRQ may be dynamically allocated based upon, for example, statistical information and information (e.g., actual demand information) about the connections.

In some embodiments, the present invention may find use with, for example, remote direct memory access (RDMA) applications or RDMA-based applications such as, for example, Internet small computer system interface (iSCSI) over RDMA (iSER) applications. In addition, the present invention may find use with, for example, kernel mode applications or user mode applications.

In some embodiments, the present invention may provide a controller (e.g., a storage controller) that may be adapted to dynamically assign resources for messages (e.g., unsolicited messages) while supporting a large number of connections. In other embodiments, the present invention may provide a controller that may be adapted to dynamically assign resources per activity on a particular connection. In still other embodiments, the present invention may provide a controller that may be adapted to recoup buffers (e.g., RQ buffers) that have been posted for a particular connection that is becoming or has become inactive. In yet other embodiments, the present invention may provide a controller that may be adapted to enhance efficiency or to match application needs by running in, for example, a kernel mode or a user mode.

Figure 1:
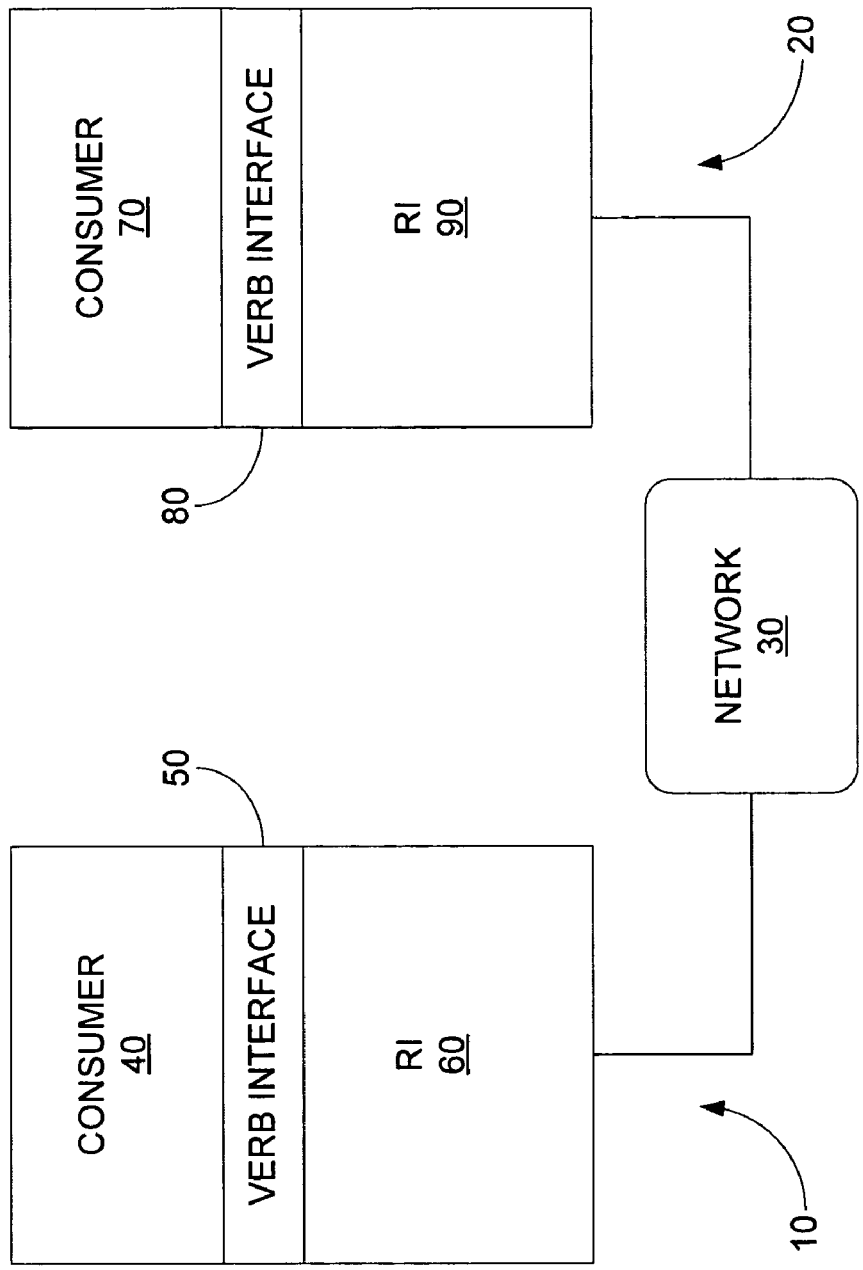
FIG. 1 shows a block diagram illustrating an embodiment of a system that provides receive queue provisioning according to the present invention.

FIG. 1 shows a block diagram illustrating an embodiment of a system that provides receive queue provisioning according to the present invention. A first node 10 may be coupled to a second node 20 over one or more connections via a network 30. A particular node may be coupled to one or more other nodes (not shown) via the network 30. The first node 10 may include, for example, a consumer 40, a verb interface 50 and an RDMA-enabled network interface card interface (RI) 60. The verb interface 50 may include or may be replaced by an application programming interface (API). The second node 20 may include, for example, a consumer 70, a verb interface 80 and an RI 90. Although some embodiments according to the present invention may employ certain aspects of an RDMA-enabled system, the present invention need not be so limited. Accordingly, some embodiments according to the present invention may employ, for example, a network interface card interface instead of an RI.

The consumer 40 of the first node 10 may be in communications with the consumer 70 of the second node 20. The consumer 40 may be coupled to the RI 60 via the verb interface 50. The RI 60 may be coupled to the RI 90 via the network. The RI 90 may be coupled to the consumer 70 via the verb interface 80.

In operation according to one embodiment, the consumer 40 may communicate with the consumer 70 resulting in, for example, the sending of information from the first node 10 to the second node 20. The consumer 40 may communicate with the RI 60 by using, for example, verbs. The RI 60 may then perform the requested operation. In one example, the requested operation may include, for example, sending and storing data from the first node 10 to the second node 20. Accordingly, data may be sent from the RI 60 to the RI 90 via the network 30. The consumers 40, 70 may be, for example, in two-way communications sending information back and forth via the network 30.

In one embodiment, the present invention may provide that communications are achieved via one or more queue pairs (QPs) in the first node 10 and one or more QPs in the second node 20. A QP in the first node 10 and a QP in the second node 20 may support, for example, a two-way connection between the first node 10 and the second node 20. A plurality of connections may be supported, for example, by a plurality of QPs in the first node and a corresponding plurality of QPs in the second node. Each QP may include, for example, a send queue (SQ) and a receive queue (RQ). In one example, messages may be sent from an SQ in one node and received in an RQ in another node. The node receiving a message may post, for example, buffers in its RQ that may be consumed by the received messages.

In a particular node, a plurality of connections may be supported by a plurality of QPs. Although an SQ of each QP may be dedicated to each connection, an RQ may be shared by one or more QPs (i.e., by one or more connections). Thus, one or more shared RQs (SRQs) may be provided in a general pool of a particular node, thereby providing resources (e.g., buffers) for a plurality of connections.

In some embodiments according to the present invention, the use of an SRQ by one node may not be known or visible to another node. The SRQ may be, for example, a local concept or a local policy. RQ resources corresponding to communications with multiple remote nodes may be locally grouped and provisioned by one or more SRQs. In one embodiment, multiple remote nodes may be served by one or more SRQs. In another embodiment, a single remote node with multiple connections may be served by one or more SRQs. In yet another embodiment, a group of nodes associated with a particular application or with a particular trust level may be served by one or more SRQs.

Each connection maintained by the nodes 10, 20 may have its own buffering needs which may change with time and which may depend upon the type of connection. Thus, the nodes 10, 20 may provide statistical provisioning of resources (e.g., buffers) for the connections.

In one embodiment, the present invention may provide that the nodes 10, 20 provide statistical provisioning for the SRQ resources. Thus, a node 10, 20 may provide local control for the provisioning of a local SRQ. The use of a local SRQ by one node may not necessarily be known or visible to another node. Local control may minimize delays, for example, in adjusting resource allocations. In addition, local control may support, for example, real-time resource management. The information used in determining the statistical provisioning may be include, for example, static data (e.g., data tables programmed with preset values) or dynamic data (e.g., local empirical data which may change over time). Furthermore, other information that may affect statistical provisioning may include, for example, connection parameters such as, for example, the type of connection, the number of connections and the status of connections.

In another embodiment, the present invention may provide that the nodes 10, 20 provide local control over the resource allocation of each connection. For example, a node 10, 20 may provide a limit as to the number of buffers (e.g., buffers of the SRQ) a particular connection may access at a given time. Thus, for example, the node 10, 20 may make more buffers of an SRQ accessible to an active connection (e.g., a storage target connection) than to an inactive or relatively less active connection (e.g., a desktop connection for e-mail which is accessed only a few times daily). Furthermore, as active connections become less active, the node 10, 20 may make fewer buffers accessible to such less active connections. In the event that a particular connection limit is exceeded, the node 10, 20 may, for example, increase the limit, replenish the buffers, drop the connection or drop data packets carried by the connection. The node 10, 20 may also, upon exceeding a limit, analyze the connection behavior to determine whether, for example, to retune resources, adjust the limit or dry out resources if the connection behavior is indicative of a malicious attack. In one example, if a desktop e-mail connection (i.e., a relatively inactive connection) suddenly becomes active, thereby exceeding its local limit, then the desktop connection may be dropped. Accordingly, a less important connection may be dropped before consuming too many buffers, thereby possibly taking away resources from more important connections (e.g., a database connection that is generally very active).

Limits may be, for example, soft or hard. A soft limit may generate, for example, a local indication to the local buffer management that can analyze connection behavior to determine a course of action. The soft limit may provide a graceful manner in which to handle error conditions or unforeseen conditions (e.g., bursty conditions). A hard limit may trigger an automatic response (e.g., closing a connection) as determined by the local buffer management.

To respond to out-of-order messages (e.g., which may be a form of malicious attack), a QP may consume buffers for the messages in between the next in-order message $M_{N+1}$ and the out-of-order message $M_{N+x}$. This may guarantee that the QP has enough resources for all messages and may simplify operation. The QP may use the sequence number of the incoming message (e.g., as provided by a direct data placement (DDP) protocol message) to determine the number of expected messages between the next in-order expected message $M_{N+1}$ and the out-of-order message $M_{N+x}$ carrying a sequence number of N+x. The QP may then be allocated buffers for all of the messages (i.e., x buffers). If x is large, limited by the only the TCP receive window, then it may starve other QPs. In one embodiment, the buffer manager may impose an out-of-order limit (e.g., setting the out-of-order limit to x) on each QP to prevent it from a particular QP from starving other QPs as may occur during a malicious attack. The out-of-order limit may be different from other limits in other layers dealing with out-of-order messages. In another embodiment, the buffer manager limit may be combined with other limits such as, for example, a TCP limit on the number of holes (i.e., one or more ranges in sequence space between the sequence numbers of received messages) that can be managed. If either of the limits are exceeded, then a frame may be dropped. In providing buffers to the SRQ, the buffer manager may take into account that each QP may have out-of-order messages.

In yet another embodiment, the present invention may provide a watermark that may be used to indicate a particular level (e.g., a low threshold level) of available resources in the SRQ of a node 10, 20. When the available resources of the SRQ become too low so as to reach the watermark, an event may be generated. Accordingly, a buffer manager or an upper layer protocol (ULP) layer or the RI 60, 90 may then be alerted to a potential problem (e.g., a malicious attack, a malfunctioning connection, a runaway QP, etc.) The ULP layer or the RI 60, 90 may then attempt to identify the source of the offending or excessive traffic and deal with it (e.g., drop a connection with excessive traffic).

Figure 2:
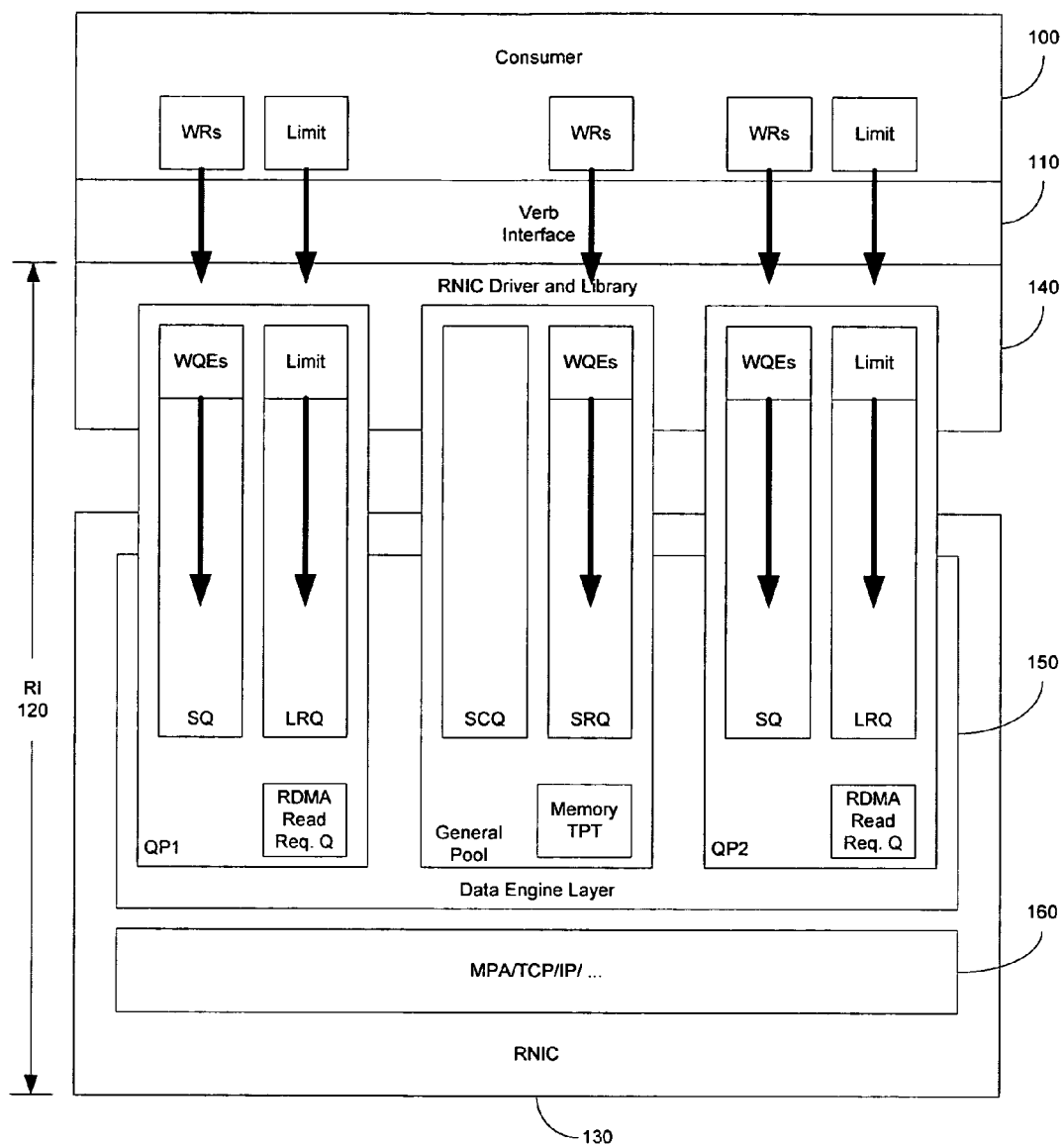
FIG. 2 shows a representation illustrating an embodiment of a node according to the present invention.

FIG. 2 shows a representation illustrating an embodiment of a node according to the present invention. The node may include, for example, a consumer 100, a verb interface 110 and an RI 120. The consumer 100 and the RI 120 may be in communications with each other via, for example, the verb interface 110. The RI 120 may include, for example, an RDMA-enabled network interface card (RNIC) 130 and an RNIC driver and library 140. The RNIC 130 may include, for example, a data engine layer 150 and a protocol processing layer 160. The RI 120 may also include, for example, a plurality of QPs (e.g., QP1 and QP2) and a general pool. In one example, each QP may include, for example, an SQ, a limit receive queue or a limit for a receive queue (LRQ) and an RDMA read request queue. The general pool may include, for example, a shared completion queue (SCQ), an SRQ and a memory translation and protection table (TPT) for resources attached to the SRQ. The SCQ and the SRQ may be shared by at least some of the QPs. However, a QP that shares an SRQ need not necessarily share an SCQ. There need not be a link between QPs sharing one or more SRQs and QPs sharing one or more SCQs.

Figure 3:
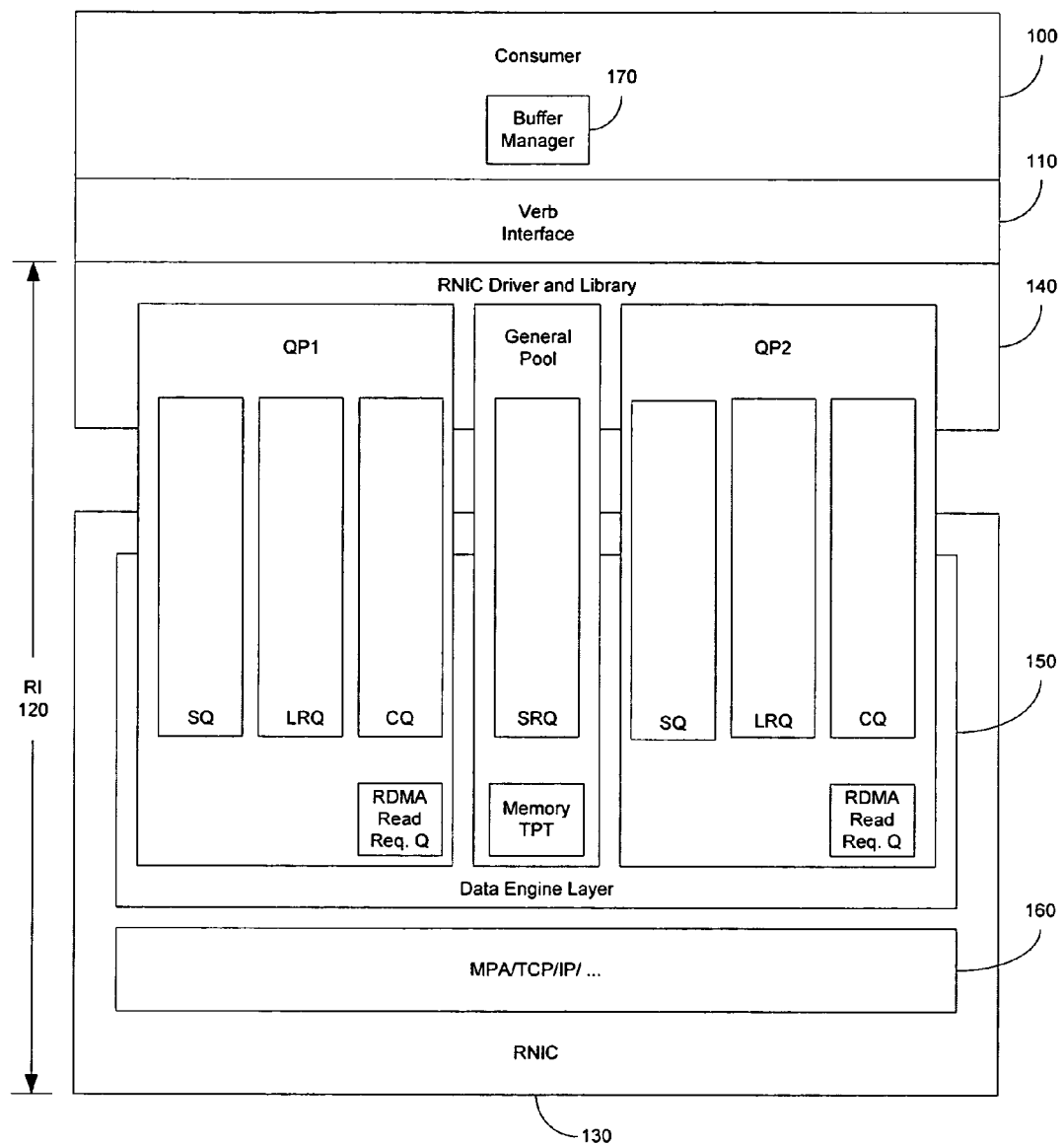
FIG. 3 shows a representation illustrating another embodiment of a node according to the present invention.

FIG. 3 shows a representation illustrating another embodiment of a node according to the present invention. The node illustrated in FIG. 3 has many of the same components as the node illustrated in FIG. 2. Referring to FIG. 3, a buffer manager 170 may manage, for example, the general pool including, for example, the SRQ. The buffer manager 170 may also manage the LRQs of the QPs. Although illustrated as a single buffer manager 170, a plurality of buffer managers may be used. Also, although illustrated as part of the consumer 100, the buffer manager 170 may be part of other components or shared by other components such as, for example, the RI 120. FIG. 3 shows that the present invention also contemplates that the CQ may be a dedicated CQ disposed within each QP.

Referring to FIG. 2 or FIG. 3, the consumer 100 may include, for example, a verb consumer and may be in the form of, for example, a software program or an application. The consumer 100 may be, for example, a kernel mode application or a user mode application. In one embodiment, the consumer 100 may be, for example, an application (e.g., a storage application) that is trusted by the operating system of the node. The consumer 100 may even be part of the operating system. In another embodiment, the consumer 100 may be, for example, an application (e.g., a third party application) that need not be entirely trusted by the operating system of the node. The consumer 100 might not even be part of the operating system and may be deemed to be a relatively unsecured application.

The verb interface 110 may provide an interface (e.g., a software process) between the consumer 100 and the RI 120. Communications between the consumer 100 and the RI 120 may be achieved, for example, through the use of verbs which may perform, for example, one or more of the following: managing a connection state; managing the memory TPT; submitting work to the RNIC 130; and retrieving work and events from the RNIC 130.

The RI 120 may perform work, for example, on behalf of the consumer 100. The RI 120 may include, for example, software, firmware, hardware or combinations thereof. The RI 120 may be adapted to perform, for example, one or more of the following: queuing; managing memory; converting work requests (WRs) into work queue elements (WQEs); supporting RDMA, DDP or other protocols; converting completion queue elements (CQEs) into work completions (WCs); and generating asynchronous events.

Work may be submitted in the form of a WR. The WR may include, for example, a scatter/gather list (SGL) of local data segments. A local data segment may include, for example, a local steering tag (STag), a local target offset, a length or other modifiers or descriptors. Some examples of WR types include, for example, send, RDMA write, RDMA read, bind memory window, etc.

The RI 120 may convert WRs into WQEs and may process the WQEs. The RI 120 may return control to the consumer 100 after the WR has been converted to a WQE and submitted to the SQ. In one embodiment, the RI 120 may not modify the WR after control has been returned to the consumer.

Tagged buffers may be used, for example, for solicited activity. Tagged activity may employ, for example, the SQ. Untagged buffers may be used, for example, on the SRQ. The CQE may be used, for example, to report completion for the posted SQ/SRQ WQEs. The CQ may be shared or non-shared. Statistical provisioning of the CQEs may be used. In some embodiments, some minimum may be guaranteed per a verb specification to ensure proper operation.

The protocol processing layer 160 may process some of the layered protocols encapsulated in incoming packets using, for example, layered or rototilled protocol processing. In one example, the protocol processing layer 160 may process, for example, one or more of the following protocols: an upper layer protocol; a marker-based upper layer protocol data unit (ULPDU) aligned (MPA) framing protocol or a framing protocol data unit (FPDU) protocol; a transport protocol (e.g., a transmission control protocol (TCP)); an Internet Protocol (IP); and a data link layer protocol (e.g., an Ethernet). Examples of some MPA framing protocols may be found in, for example, U.S. patent application Ser. No. 10/230,643, entitled "System and Method for Identifying Upper Layer Protocol Message Boundaries" and filed on Aug. 29, 2002. The above-referenced United States patent application is hereby incorporated herein by reference in its entirety. Other examples of some MPA framing protocols may be found, for example, in conventional MPA framing protocols.

With regard to RQ sharing, one or more of the following may be applicable according to the present invention. The RQ may be a central resource. A buffer manager such as, for example, one or more buffer managers 170, may allocate local limits to one or more QPs (e.g., all QPs). Each QP may draw based upon its respective local limit and the resources available in the SRQ. The top of the CQ processing may determine credit consumption by the QP. New credit may be replenished to each QP on its credit receive queue (CRQ).

In one embodiment, the system may support SRQ resources less than, for example, a total SRQ limit. A local limit may be set via the LRQ for each QP, thereby setting a local maximum for resource consumption in a respective QP. The local limit as well as total limit may be subject to statistical provisioning. For example, the total limit may be related to the sum of the individual statistical provisionings. If a local limit has been reached without replenishment, then connection tear down may occur on the overdraft.

Figure 4A:
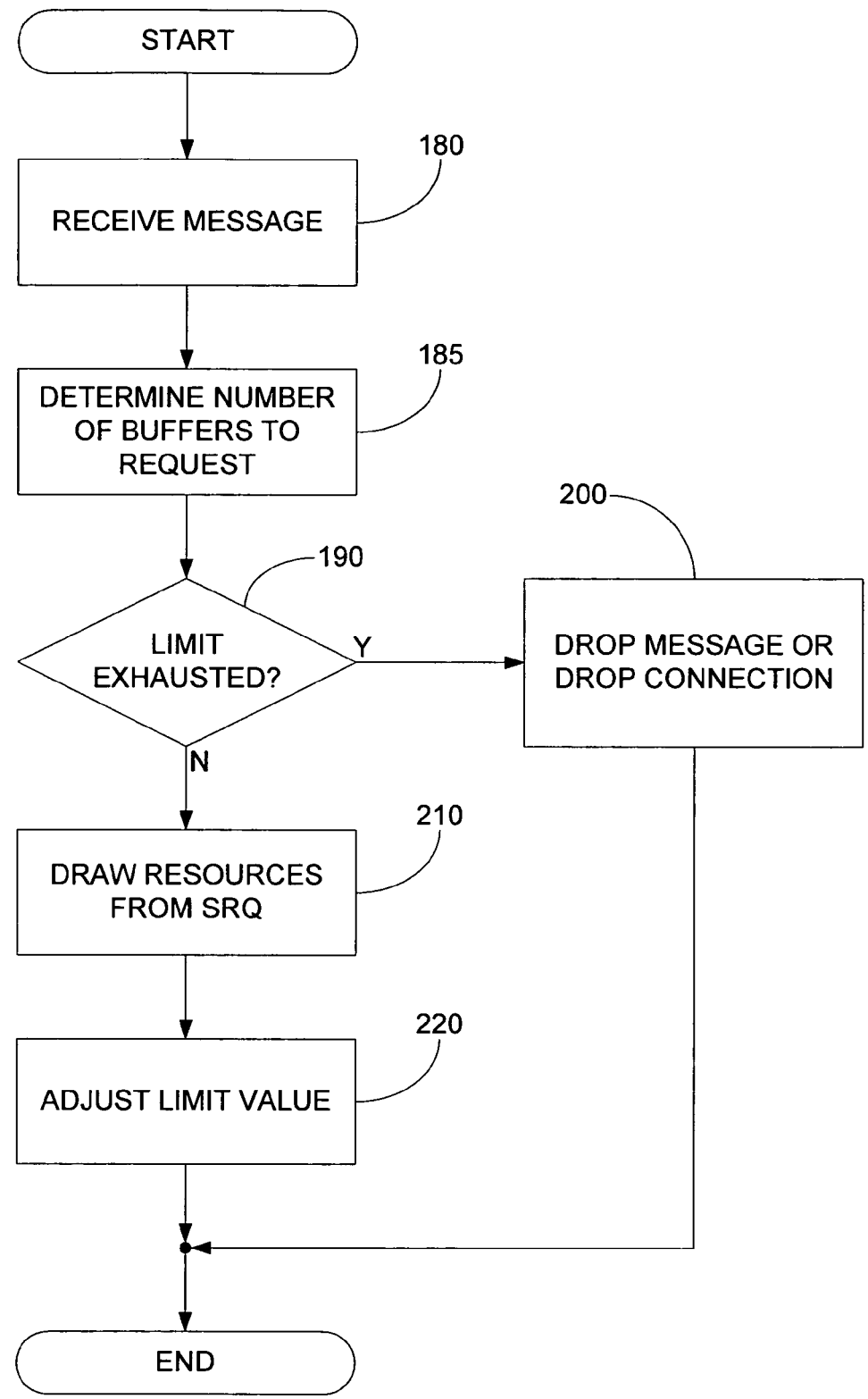
FIGS. 4A-B show flowcharts illustrating an embodiment of a process that manages a queue pair (QP) limit mechanism according to the present invention.
Figure 4B:
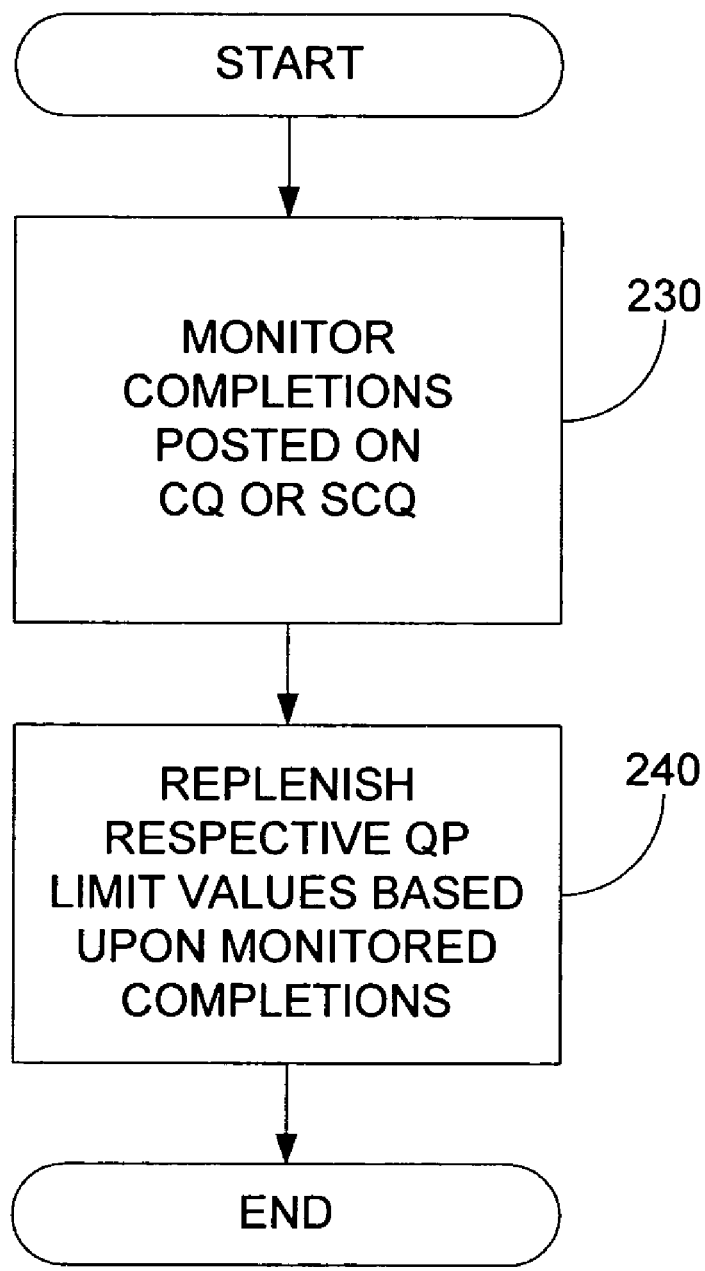

FIGS. 4A-B show flowcharts illustrating an embodiment of a process that manages a local limit mechanism according to the present invention. The local limit management process may provide a short control loop. Accordingly, management operations such as, for example, replenishing local limit values associated with respective QPs, may be accomplished in a timely manner.

Referring to FIG. 4A, in step 180, a message (e.g., a send message) may be received on a particular connection via a corresponding QP. In step 185, the QP may determine the number of buffers that it may request from the SRQ. In one example, if the received message is an in-order message (e.g., with respect to a DDP message sequence number), then the QP may request, for example, one buffer from the SRQ. In another example, if the received message is an out-of-order message, then the QP may request, for example, one or more buffers from the SRQ. In query 190, the QP or an associated buffer manager 170 may determine whether the local limit of the QP has been exhausted. The buffer manager 170 may be a part of one or more QPs. In one embodiment, the buffer manager 170 may determine whether the local limit of the QP has been reduced to zero (i.e., the QP has reached its limit). In another embodiment, the QP may determine whether the local limit of the QP has been reduced to zero (i.e., the QP has reached its limit). If the limit has been exhausted, then, in step 200, the message may be dropped or the connection may be dropped. The QP may not be able to draw buffers in excess of its limit value. In one embodiment, if the limit has been exhausted, if more buffers are requested than the limit will allow, or if an out-of-order message threshold has been exceeded, then, in step 200, the message may be dropped or the connection may be dropped. In the case of out-of-order messages, the buffer manager 170 or the QP may have separate limits as to the number of buffers that may be drawn off from the SRQ when, for example, message $M_{N+x}$ is received while message $M_{N+1}$ is expected and x is larger than a particular out-of-order threshold. If the limit has not been exhausted, then, in step 210, the QP may draw a buffer from the SRQ. In step 220, the QP or the buffer manager 170 may then decrement the local limit value associated with the QP.

FIG. 4B shows a flowchart illustrating an embodiment of a process that replenishes a local limit mechanism according to the present invention. Referring to FIG. 4B, in step 230, the buffer manager 170 or the QP may monitor buffer usage. In one embodiment, the buffer manager 170 may monitor buffer usage by monitoring completions posted on the CQ or the SCQ. In step 240, the buffer manager 170 may adjust (e.g., replenish) respective QP local limit values based upon the monitored completions posted on the CQ or the SCQ. In one embodiment, the buffer manager 170 may add a delta value to a current local limit value of a respective QP. In another embodiment, the QP may monitor buffer usage by monitoring completions it posts on a CQ or an SCQ. In yet another embodiment, in step 240, the QP may adjust (e.g., replenish) its QP local limit values based upon completions posted on a CQ or an SCQ. The QP may add a delta value to its current local limit value.

Figure 5:
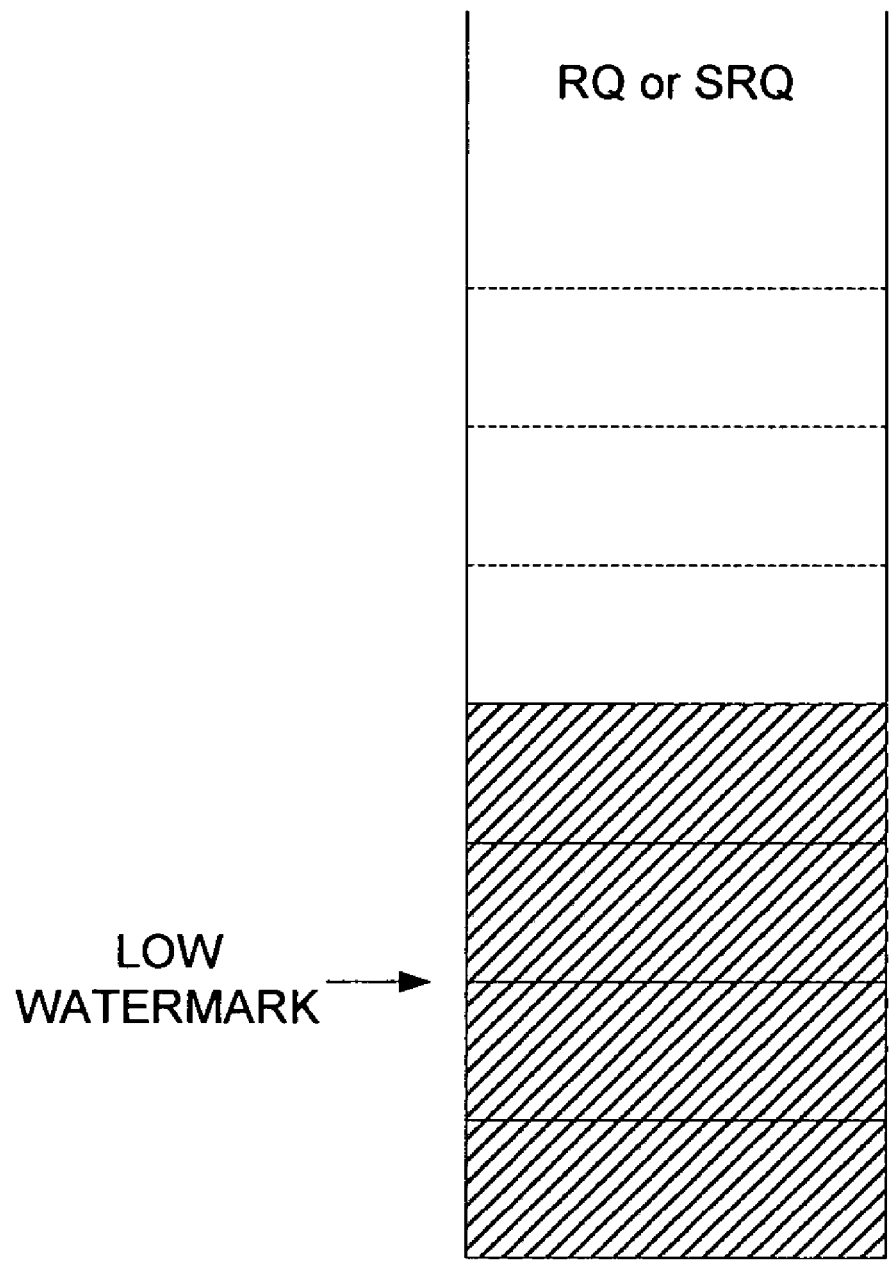
FIG. 5 shows a representation of an embodiment of a watermark according to the present invention.

FIG. 5 shows a representation illustrating an embodiment of a low watermark associated with an SRQ according to the present invention. A low watermark may offer a mechanism with which to detect a low level of resources (e.g., WQEs) on the SRQ. Verbs may be used to support the detection mechanism. The RI 120 or the RNIC 130, for example, may be used to determine (e.g., to quantify) the number of available WQEs on the SRQ. The buffer manager 170, the RI 120 or the RNIC 130 may compare the number of available WQEs on the SRQ with the low watermark and may generate an event (e.g., an unaffiliated asynchronous event) when the SRQ occupancy drops below the low watermark.

Depletion of SRQ resources may be the result of, for example, an attack from one or more malicious connections or malfunctioning connections. When the resources of the SRQ fall below the low watermark, the buffer manager or the ULP layer may be notified via an asynchronous event. The buffer manager or the ULP layer may attempt to identify the one or more offending connections. For example, if the attack comprises mostly in-order messages, then the ULP layer may analyze the completions off the CQ or SCQ to determine which QP or QPs are the source of the excessive traffic (e.g., runaway traffic). For example, the excessive traffic may be the result of offending traffic such as, for example, too many unsolicited data protocol data units (PDUs); the breaking of unsolicited data into many small direct data placement (DDP) messages; too many no operations (NOPs); too many read commands, etc. The ULP layer may also use heuristics to analyze traffic patterns per connection to aid in identifying the offending QP. In addition, to further assist in the identification of the offending connection, the ULP layer or the buffer manager 170 may perform per-QP score boarding with aging. Additional buffer provisioning may be used to account for any processing latency.

In the case in which the attack comprises mostly out-of-order messages, the ULP layer may not be able to identify rogue connections since, for example, many out-of-order messages can occupy WQEs that the RI 120 cannot complete to the CQ or SCQ. The ULP layer may observe, for example, a large gap between the number of posted WQEs on the SRQ and the number of CQEs on the CQ or SCQ. The ULP layer may lack visibility as the number of uncompleted WQEs that each QP is consuming from the SRQ. Accordingly, the node may be adapted to enhance visibility or to control out-of-order WQE occupancy. In one embodiment, the node may be adapted such that no more than a threshold number of out-of-order WQEs may occur on the SRQ. In another embodiment, the node may be adapted such that no more than a respective threshold number of out-of-order WQEs may occur per QP. The threshold number may vary from QP to QP. Accordingly, a particular QP may not exceed its respective out-of-order limit. In yet another embodiment, the node may be adapted such that all WQEs holding out-of-order messages may be completed with error status to prevent buffer starvation from the SRQ upon reaching a particular high watermark.

One or more embodiments according to the present invention may include, for example, one or more advantages as set forth below.

A general pool implementation may be applicable to either kernel space or user space. The SRQ may be used as a general pool for use with, for example, receive-untagged WQEs. Such an implementation may have, for example, one or more of the following advantages. Resources may be administered locally and may be more flexible. The general pool need not necessitate a flow control for ULPs (e.g., iSER) using the RI nor changes to the ULP or to the wire protocols. A round trip delay might not be assessed each time a resource allocation is adjusted. The general pool implementation may provide scalability for a large number of QPs. The implementation may provide a simplified management scheme of buffers for use with, for example, unsolicited activities, commands and task management. Verbs used with respect to sharing the CQ may also be applicable to sharing the RQ. WQEs need not be completed in order to the CQ. Some embodiments may include buffers, which are all the same size, and may share regions among participating QPs. As the limit may be optional as well as on top of the SRQ, in some embodiments according to the present invention, latencies may not be present as the QPs may manage the buffer consumption.

In some embodiments of the present invention, an SRQ may be provided for use, for example, in a user mode (e.g., an RDMA user mode). Some applications (e.g., database applications, interprocess communication (IPC) applications, etc.) may concurrently use a plurality of QPs. For example, on a particular Tier 2 or a particular Tier 3 server, the number of multiple concurrent QPs may range, for example, from approximately 1,000 QPs to approximately 64,000 QPs. By using an SRQ, instead of each QP having its own solely dedicated RQ, precious system resources may be conserved. For example, if a particular connection is relatively inactive, then statistical provisioning may allocate less than the respective maximum amount of resources to the relatively inactive connection. As a numerical example, instead of providing a full window of 64 KB for every connection of 1000 connections for a total of 64 MB, it may suffice to provide for the longest burst at wire speed before the buffer manager can react by providing more resources (e.g., for a long 1 ms latency of the buffer manager on a 1 gigabit network only 1 MB may be required). In another example, a shared pool may save a substantial amount of system resources, for example, at least for threads of the same process where security schemes (e.g., protection domain schemes) allow.

The RNIC 130, which may have limited on-chip memory, may be adapted to keep state for all active QPs. This may include, for example, a few entries of the SRQ (e.g., a few WQEs). The RNIC 130 may be adapted to handle, for example, out-of-order reception (e.g., potentially receiving message $M_{N+x}$ into $WQE_{N+x}$), without substantially increasing on-chip caching requirements. In one embodiment, on-chip caching requirements may be alleviated by employing an SRQ in a general pool that may result in less context being kept by each QP. Savings due to the general pool configuration can be quite substantial. In one example, savings of up to approximately 20 percent may be realized. Additional savings including other savings values in excess of approximately 20 percent are also contemplated by the present invention.

The scalability of the RNIC 130 may be enhanced by caching some of the QP context. QP context may be fetched when a respective QP becomes active or becomes increasingly active. Caching may be further enhanced by reducing the size of the QP context. In one example, SRQ WQEs per QP might not be stored. One or more embodiments may benefit from fewer bytes being transferred over a particular time period (e.g., a limited time). Furthermore, an improved real-time solution may be provided with less host bus (e.g., PCI, PCI-X or PCI-Express) arbitration and fewer host bus transactions.

The local limits of respective QPs may allow for the sharing of the SRQ among connections, for example, that are not necessarily affiliated with the same credentials. For example, a plurality of desktops and a server may share the SRQ even though desktops may often be dormant and may not be physically secured like a server. The local limits may also contain the damage that a remote attacking QP may maliciously inflict. Thus, for example, one malicious or malfunctioning connection might not be able to consume all of the SRQ resources, thereby starving other connections sharing the SRQ resources. The local limits may also provide a basic quality of service (QoS) mechanism by which some connections are assigned priority over other connections with respect to any shared resources. Local limiting may also provide for analyzing and adjusting the level of provisioning on a per connection basis. In addition, the local limits may allow for the sharing of STags. For example, STags for tagged buffers may be shared among multiple connections (e.g., connections that may not be trusted) per session.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A communications system, comprising:
    a first queue pair (QP) associated with a first connection;
    a second QP associated with a second connection;
    a shared receive queue (SRQ) shared by the first QP and the second QP; and
    a watermark indicating a low level of work queue elements (WQEs) on the SRQ,
    wherein an out-of-order WQE limit is associated with the SRQ.

2. The communications system according to claim 1, wherein, if a number of WQEs on the SRQ drops below the watermark, then an asynchronous event is generated.

3. The communications system according to claim 2, wherein the asynchronous event notifies at least one of an upper layer protocol (ULP) layer, a buffer manager, and any part of a consumer that the number of WQEs on the SRQ has dropped below the watermark.

4. The communications system according to claim 2, wherein at least one of an ULP layer, a buffer manager, and any part of a consumer analyzes completions posted on a shared completion queue (SCQ) shared by the first QP and the second QP.

5. The communications system according to claim 4, wherein the ULP layer determines which of the first QP or the second QP is transporting excessive traffic or offending traffic.

6. The communications system according to claim 1, comprising:
    a manager that provides statistical provisioning for the SRQ.

7. The communications system according to claim 6,
    wherein an incoming message is received by the first QP,
    wherein at least one of the first QP and the manager determines a number of resources to request for the first QP, and
    wherein at least one of the first QP and the resource manager determines whether the first QP is allowed to draw any resources from the SRQ.

8. The communications system according to claim 1, wherein the first QP and the second QP are part of a particular node.

9. A communications system, comprising:
    a first queue pair (QP) associated with a first connection;
    a second QP associated with a second connection;
    a shared receive queue (SRQ) shared by the first QP and the second QP; and
    a watermark indicating a low level of work queue elements (WQEs) on the SRQ,
    wherein a first out-of-order WQE limit is associated with the first QP, and
    wherein a second out-of-order WQE limit is associated with the second QP.

10. The communications system according to claim 9, wherein, if a number of WQEs on the SRQ drops below the watermark, then an asynchronous event is generated.

11. The communications system according to claim 10, wherein the asynchronous event notifies at least one of an upper layer protocol (ULP) layer, a buffer manager, and any part of a consumer that the number of WQEs on the SRQ has dropped below the watermark.

12. The communications system according to claim 10, wherein at least one of an ULP layer, a buffer manager, and any part of a consumer analyzes completions posted on a shared completion queue (SCQ) shared by the first QP and the second QP.

13. The communications system according to claim 12, wherein the ULP layer determines which of the first QP or the second QP is transporting excessive traffic or offending traffic.

14. The communications system according to claim 9, comprising:
    a manager that provides statistical provisioning for the SRQ.

15. The communications system according to claim 14, wherein the first QP and the second QP are part of a particular node.

16. The communications system according to claim 14, wherein an incoming message is received by the first QP,
wherein at least one of the first QP and the manager determines a number of resources to request for the first QP, and
wherein at least one of the first QP and the resource manager determines whether the first QP is allowed to draw any resources from the SRQ.

17. A method for communications, comprising:
sharing a receive queue (RQ) between a first queue pair (QP) associated with a first connection and a second QP associated with a second connection;
setting a threshold that is associated with the shared RQ and is indicative of a particular number of work queue elements (WQEs) on the shared RQ;
generating an asynchronous event if the threshold is reached; and
setting an out-of-order WQE limit for the shared RQ.

18. The method according to claim 17, comprising:
analyzing completions on a completion queue (CQ) to determine if either the first QP or the second QP is draining the WQEs on the shared RQ.

19. The method according to claim 18, wherein the CQ comprises at least one of a dedicated CQ and a shared completion queue (SCQ).

20. The method according to claim 17, comprising:
dropping a WQE holding an out-of-order message from the SRQ upon reaching a particular watermark.

21. A method for communications, comprising:
sharing a receive queue (RQ) between a first queue pair (QP) associated with a first connection and a second QP associated with a second connection;
setting a threshold that is associated with the shared RQ and is indicative of a particular number of work queue elements (WQEs) on the shared RQ;
generating an asynchronous event if the threshold is reached; and
setting a first out-of-order WQE limit for the first QP.

22. The method according to claim 21, comprising:
analyzing completions on a completion queue (CQ) to determine if either the first QP or the second QP is draining the WQEs on the shared RQ.

23. The method according to claim 22, wherein the CQ comprises at least one of a dedicated CQ and a shared completion queue (SCQ).

24. The method according to claim 21, comprising:
dropping a WQE holding an out-of-order message from the SRQ upon reaching a particular watermark.

25. A method for communications, comprising:
sharing a receive queue (RQ) between a first queue pair (QP) associated with a first connection and a second QP associated with a second connection;
setting a threshold that is associated with the shared RQ and is indicative of a particular number of work queue elements (WQEs) on the shared RQ;
generating an asynchronous event if the threshold is reached; and
setting an out-of-order WQE limit which is part of another local limit.

26. The method according to claim 25, comprising:
analyzing completions on a completion queue (CQ) to determine if either the first QP or the second QP is draining the WQEs on the shared RQ.

27. The method according to claim 26, wherein the CQ comprises at least one of a dedicated CQ and a shared completion queue (SCQ).

28. The method according to claim 25, comprising:
dropping a WQE holding an out-of-order message from the SRQ upon reaching a particular watermark.

* * * * *